(12) United States Patent
Jeong et al.

(10) Patent No.: US 7,050,511 B2
(45) Date of Patent: May 23, 2006

(54) IN-BAND ADJACENT-CHANNEL DIGITAL AUDIO BROADCASTING SYSTEM

(75) Inventors: Young-Ho Jeong, Taejon (KR); So-Ra Park, Seoul (KR); Geon Kim, Taejon (KR); Soo-In Lee, Taejon (KR)

(73) Assignee: Electronics and Telecommunications Research Institute (KR)

( * ) Notice: Subject to any disclaimer, the term of this patent is extended or adjusted under 35 U.S.C. 154(b) by 782 days.

(21) Appl. No.: 09/967,548

(22) Filed: Sep. 28, 2001

(65) Prior Publication Data

US 2002/0080887 A1 Jun. 27, 2002

(30) Foreign Application Priority Data

Oct. 20, 2000 (KR) .............................. 2000-62049

(51) Int. Cl.
*H03C 1/52* (2006.01)
*H04L 27/04* (2006.01)

(52) U.S. Cl. .................. 375/301; 375/265; 375/277; 375/308

(58) Field of Classification Search .......... 714/761, 714/762, 784, 786; 375/265, 277, 295, 298, 375/299, 301, 302, 308
See application file for complete search history.

(56) References Cited

U.S. PATENT DOCUMENTS

| | | | |
|---|---|---|---|
| 5,850,415 A | 12/1998 | Hunsinger et al. .......... 375/216 |
| 6,285,681 B1 * | 9/2001 | Kolze et al. ................ 370/442 |
| 6,598,200 B1 * | 7/2003 | Greenwood et al. ........ 714/774 |
| 6,687,315 B1 * | 2/2004 | Keevill et al. .............. 375/341 |
| 6,704,366 B1 * | 3/2004 | Combes et al. ............. 375/260 |
| 2001/0024475 A1 * | 9/2001 | Kumar ....................... 375/270 |
| 2001/0055297 A1 * | 12/2001 | Benveniste ................. 370/349 |

* cited by examiner

*Primary Examiner*—Kevin Burd
*Assistant Examiner*—Freshteh N Aghdam
(74) *Attorney, Agent, or Firm*—Blakely Sokoloff Taylor & Zafman

(57) ABSTRACT

The in-band adjacent-channel digital audio broadcasting system includes a scrambling unit for scrambling a signal to be broadcasted, thereby generating a scrambled signal; an outer coding unit for performing a first encoding of the scrambled signal, thereby generating an outer encoded signal; an outer interleaving unit for performing a first interleaving of the outer encoded signal a byte by byte basis, thereby generating an outer interleaved signal; an inner coding unit for performing a second encoding the outer interleaved signal, thereby generating an inner encoded signal; an inner interleaving unit for performing a second interleaving of the inner encoded signal, thereby generating an inner interleaved signal; a modulating unit for modulating the inner interleaved signal, thereby generating an orthogonal frequency division multiplexing (OFDM) symbols; a guard interval inserting unit for inserting a guard interval between the OFDM symbols in order to eliminate an inter-symbol interference, thereby generating an OFDM frame; and an RF processing unit for performing a conversion of the OFDM frame into an analog radio frequency signal so that the OFDM signal can be transmitted in a specific frequency channel of an FM frequency band, and for amplifying and outputting the analog radio frequency signal.

12 Claims, 25 Drawing Sheets

(1) $(C_2+C_1+C_0)D^8+C_2D^7+C_1D^6+C_1D^5+(C_2+C_1)D^4+(C_1+C_0)D^3+C_0D^2+(C_1+C_0)D+C_2+C_1=C_0$ (2) $C_0\underline{(D^8+D^3+D^2+D+1)}+C_1\underline{(D^8+D^6+D^5+D^4+D^3+D)}+C_2\underline{(D^8+D^7+D^4+1)}=0$
$\phantom{(2) C_0}h_0 \phantom{(D^8+D^3+D^2+D+1)+C_1}h_1 \phantom{(D^8+D^6+D^5+D^4+D^3+D)+C_2}h_2$ (3) (100001111) (101111011) (110010001)

(4) (417)oct (573)oct (621)oct (1) $(C_3+C_2+C_1+C_0)D^6+(C_3+C_2+C_1)D^5+C_3D^4+(C_3+C_2+C_1)D^3+(C_3+C_2+C_0)D^2+(C_2+C_1)D+C_3+C_2+C_1=$ (2) $C_0\underline{(D^6+D^2+1)}+C_1\underline{(D^6+D^5+D^3+D+1)}+C_2\underline{(D^6+D^5+D^3+D^2+D+1)}+C_3\underline{(D^6+D^5+D^4+D^3+D^2+1)}=0$
$\phantom{(2) C_0}h_0 \phantom{(D^6+D^2+1)+C_1} h_1 \phantom{(D^6+D^5+D^3+D+1)+C_2} h_2 \phantom{(D^6+D^5+D^3+D^2+D+1)+C_3} h_3$ (3) (1000101) (1101011) (1101111) (1111101)

(4) (105)oct (153)oct (157)oct (175)oct

FIG. 13

| f(i)=BIT REVERSE OF(i mod m) | |
|---|---|
| i mod 16 | f(i) |
| 0 | 0 |
| 1 | 8 |
| 2 | 4 |
| 3 | 12 |
| 4 | 2 |
| 5 | 10 |
| 6 | 6 |
| 7 | 14 |
| 8 | 1 |
| 9 | 9 |
| 10 | 5 |
| 11 | 13 |
| 12 | 3 |
| 13 | 11 |
| 14 | 7 |
| 15 | 15 |

FIG. 15

| i | A(i) | j | B(i) | k | C(k) |
|---|---|---|---|---|---|
| 0 | 0 | – | – | – | – |
| 1 | 127 | 0 | 54 | 0 | 116 |
| 2 | 242 | 1 | 169 | 1 | 231 |
| 3 | 201 | 2 | 128 | 2 | 190 |
| 4 | 180 | 3 | 107 | 3 | 169 |
| 5 | 419 | 4 | 346 | 4 | 408 |
| 6 | 454 | 5 | 381 | 5 | 443 |
| 7 | 397 | 6 | 324 | 6 | 386 |
| 8 | 168 | 7 | 95 | 7 | 157 |
| ⋮ | ⋮ | ⋮ | ⋮ | ⋮ | ⋮ |
| 507 | 1 | – | – | – | – |
| 508 | 140 | 363 | 67 | 486 | 129 |
| 509 | 411 | 364 | 338 | 487 | 400 |
| 510 | 350 | 365 | 277 | 488 | 339 |
| 511 | 69 | – | – | 489 | 58 |

| CONTINUAL PILOT POSITION |
|---|
| 1  49  55  88  142  157  193  202  256  280  285  334  433  451  484 |

FIG. 20

| TPS CARRIER POSITION | | | | | | |
|---|---|---|---|---|---|---|
| 35 | 51 | 130 | 209 | 347 | 414 | 479 |

FIG. 21

| BIT NUMBER | FORMAT | | | PURPOSE/CONTENT |
|---|---|---|---|---|
| $S_0$ | DECISION BY $\omega_k$ THROUGH PRBS GENERATOR OF FIG. 19 | | | INITIALIZATION |
| $S_1 - S_8$ | 00110101 or 11001010 | | | SYNCHRONIZATION WORD |
| $S_9 - S_{12}$ | 1001 | | | LENGTH INDICATOR |
| $S_{13} - S_{14}$ | 00 | 1st FRAME OF SUPER-FRAME | | FRAME NUMBER |
| | 01 | 2nd FRAME OF SUPER-FRAME | | |
| | 10 | 3rd FRAME OF SUPER-FRAME | | |
| | 11 | 4th FRAME OF SUPER-FRAME | | |
| $S_{15} - S_{16}$ | INTERLEAVING DEPTH (=16×M×16) | | | INTERLEAVING DEPTH |
| | MODULATION TYPE | TIME | M BLOCK | |
| | 8PSK | 265ms | 1377 | |
| | | 512ms | 2754 | |
| | 16QAM | 265ms | 1836 | |
| | | 512ms | 3672 | |
| $S_{17}$ | 0 | 8PSK | | MODULATION TYPE |
| | 1 | 16QAM | | |
| $S_{18} - S_{21}$ | ALL SET TO "0" | | | RESERVED FOR FUTURE USE |
| $S_{22} - S_{31}$ | 10 PARITY BIT OF BCH(31,31,t=2) CODE | | | ERROR PROTECTION |

FIG. 22

- NUMBER OF SAMPLES PER ONE RS PACKET(16QAM) : 816 SAMPLES
- NUMBER OF SAMPLES PER ONE RS PACKET(8PSK) : 816 SAMPLES
- NUMBER OF USEFUL DATA SAMPLES PER ONE OFDM SUB-FRAME : 1836 SAMPLES

- NUMBER OF USEFUL SAMPLES PER ONE OFDM SUB-FRAME : 1836 SAMPLES

◉ 16QAM

16/4 x 1088 x 27 = 1836 x 16 x 4
16/4 x 1224 x 6 = 1836 x 16 x 1
16/4 x 1224 x 12 = 1836 x 16 x 2
16/4 x 1224 x 18 = 1836 x 16 x 3
16/4 x 1224 x 24 = 1836 x 16 x 4
16/4 x 1296 x 17 = 1836 x 16 x 3
16/4 x 1377 x 16 = 1836 x 16 x 3
16/4 x 1632 x 9 = 1836 x 16 x 2
16/4 x 1632 x 18 = 1836 x 16 x 4
16/4 x 1728 x 17 = 1836 x 16 x 4
16/4 x 1836 x 4 = 1836 x 16 x 1
16/4 x 1836 x 8 = 1836 x 16 x 2
16/4 x 1836 x 12 = 1836 x 16 x 3
16/4 x 1836 x 16 = 1836 x 16 x 4
16/4 x 2448 x 3 = 1836 x 16 x 1
16/4 x 2448 x 6 = 1836 x 16 x 2
16/4 x 2448 x 9 = 1836 x 16 x 3
16/4 x 2448 x 12 = 1836 x 16 x 4

◉ 8PSK

| | COFDM | | TCOFDM | |
|---|---|---|---|---|
| SIGNAL BANDWIDTH (kHz) | 482.2695 | | 482.2695 | |
| AUDIO CODER | AAC | | AAC | |
| OUTER CODER | REED-SOLOMON CODER (204, 188, t=8) | | REED-SOLOMON CODER (204, 188, t=8) | |
| INNER CODER | CONVOLUTIONAL CODER (R=1/2, K=7) | | TRELLIS CODER (R=2/3, K=7 OR K=9) | TRELLIS CODER (R=3/4, K=7 OR K=9) |
| MODULATION TYPE | 8PSK | 16QAM | 8PSK | 16QAM |
| SUB-CARRIER NUMBER | 512 | | 512 | |
| DATA RATE (AT MPEG-2 MUX OUTPUT)(kHz) | 562.5 | 750 | 750 | 1,125 |
| SUB-CARRIER INTERVAL (kHz) | 0.9419 | | 0.9419 | |
| OFDM FRAME DURATION (ms) | 36.096 | | 36.096 | |
| OFDM SYMBOL DURATION (ms) | 1.12795 | | 1.12795 | |
| USEFUL SYMBOL DURATION (ms) | 1.0616 | | 1.0616 | |
| GUARD INTERVAL DURATION (ms) | 66.3529 | | 66.3529 | |
| TOTAL DATA RATE (Mbps) | 1.221 | 1.628 | 1.221 | 1.628 |
| USEFUL DATA RATE (Mbps) | 562.5 | 750 | 750 | 1,125 |

IN-BAND ADJACENT-CHANNEL DIGITAL AUDIO BROADCASTING SYSTEM

FIELD OF THE INVENTION

The present invention relates to an in-band adjacent-channel digital audio broadcasting system; and, more particularly, to an in-band adjacent-channel digital audio broadcasting system which is capable of providing a high-quality audio of multichannel and data broadcasting service by maximizing a spectrum use efficiency through an application of an OFDM transmission and a higher order modulation techniques, without a necessity of ensuring a new frequency band for realizing a digital audio and data broadcasting service at the existing FM frequency band.

PRIOR ART OF THE INVENTION

In an analog FM broadcasting, a degradation in a sound quality is gradually getting serious due to an influence such as Doppler effect of carrier frequency in a moving reception and a multipath fading according to a crowded phenomenon of a gradually-increasing many-storied buildings and residences. Further, according to a numerical increase of broadcasting stations within the FM frequency band, a complication extent of frequency is very serious, and an inter-channel interference based on that makes an allocation of a new service channel difficult.

A change to a digital broadcasting is essentially required in order to settle problems of analog FM broadcasting above-mentioned. A digital audio broadcasting (DAB) has not only an audio service based on a high quality but also a potential force through an extension to a high value-added service such as the future multimedia contents service, stock and traffic information service, a GPS (Global Positioning System), a facsimile, and a wide area call etc. Digital audio broadcasting may be classified into an in-band system in which a service can be executed simultaneously with the analog broadcasting in the existing FM frequency band, and an out-of-band system which requires a new frequency band except the FM frequency band.

In the digital audio broadcasting of U.S.A, it is being considered an embodiment through the in-band system, and an in-band on-channel (IBOC) system using a multi-carrier modulation is proposed and its field test is being progressed. It is anticipated to get a transmission standardization of the digital audio broadcasting in the latter half of the year 2001.

IBOC system of U.S.A. can simultaneously provide the same programs serviced in the existing analog FM channel, and herewith, RF signal is transmitted through an upper/lower sideband spaced constant frequency apart from the center frequency of FM signal. This adopts a perceptual audio coding (PAC) as a technique for compressing an audio data and can provide only one audio program having a sound quality close to CD in one channel by a limitation of useful data rate. There are two operational modes as a hybrid mode and all digital modes according to the application method of frequency band. The hybrid mode is the type to simultaneously transmit a digital signal with the existing analog signal to the same channel, and is used during a conversion period from an analog broadcasting to a digital broadcasting. All the digital modes are the types to cease an analog broadcasting within the FM frequency band and transmit only the digital signal.

However, the IBOC system has a problem that the multichannel audio based on the high quality and data broadcasting is impossible owing to a lower useful data rate during a period that the analog broadcasting and digital broadcasting services coexist. That is, the merit of the IBOC system is just to improve the sound quality of the existing analog FM channel, until the analog broadcasting is finished, and has a problem in the future service development possibility on account of the lower useful data rate, and furthermore, can not be confronted with a requirement for the multichannel audio service with high quality and data service, to thus cause a problem that an advantage of the digital audio broadcasting can not be sufficiently allowed. Therefore, there is a problem that a differential feature from the existing analog system is not highlighted.

Eureka 147 system developed in Europe is the out-of-band system, and uses a coded-orthogonal frequency division multiplexing (COFDM), as the transmission scheme, and its standardization was completed in the early of 1995. In 1997, an MPEG-2 audio coding and a transmission mode IV were contained through a revision of standard, and at present a commercial service is under the progression.

A strongness of Eureka 147 system is a robustness of signal in multipath fading environment by applying the COFDM, and at the same time, an inter-symbol interference (ISI) can be eliminated by a guard interval. Further, not only it is advantageous to embody a single frequency network (SFN) capable of servicing, by a broadcaster, the same program in the same channel without a regional distinction, but also it is possible to provide a mobile reception service. Also, it can be operated at VHF, UHF and L/S bands of 30 MHz~3 GHz, and it is available to provide the audio and data service through a wideband of 1.536 MHz.

However, since the embodiment within the FM broadcasting frequency band due to wideband transmission is impossible without stopping the existing analog service, there is a shortcoming that a new frequency band except the FM frequency band is required. Owing to that, a service is embodied at a television channel of a VHF/UHF band or an L, S band, and most of nations have a problem that a channel allocation of the digital audio broadcasting is actually difficult to be realized till a time point before the analog television broadcasting is finished.

Further, the Eureka 147 system employs an MPEG-1 and MPEG-2 BC (Backward Compatibility) coding, but this represents a lower performance in comparison with an MPEG-2 NBC (Non-BC: it is called an Advanced Audio Coding) which was recently completed in its standardization. Data of many quantity are required by non-selection for an MPEG-2 NBC based on a superior performance, in order to get the same CD quality, and thus, there is a shortcoming that a quantity of other data to be transmitted can not help being lessened.

In a case of Japan, under a superintendence of NHK as the public broadcasting station from the year 1995, it was completed in the early of the year 1999, a standardization for a BST-OFDM(Band Segmented Transmission-OFDM) system capable of operating through a composition of respective segments (a frequency band) divided in a constant size, on the purpose of embodying an integrated services digital broadcasting (ISDB) service, and its field test is being exercised.

The BST-OFDM system is similar to a DVB-T (Digital Video Broadcasting-Terrestrial) system developed in Europe, and is the system capable of controlling an occupied bandwidth, and has the purpose of embodying integrated services digital broadcasting (ISDB) as the digital television/audio integrated service. This system uses a VHF/UHF band of an analog television, and also uses it by varying the bandwidth in such a way that the bandwidth is divided into a unit of a segment having about 430 KHz bandwidth and one segment, which is extendable to thirteen, is allocated for audio broadcasting service. Herewith, an AAC and an MPEG-2 system are respectively applied for an audio compression and a multiplexing process, to thus support three kinds of modes of 2K, 4K and 8K FFT according to the number of sub-carriers. The sub-carriers are modulated by QPSK, 16-QAM, 64-QAM and DQPSK, and as a channel coding, a concatenated channel code of an RS code and a conventional code is applied thereto. Further, the occupied bandwidth is determined by the combination of maximum thirteen OFDM segments, and the transmission parameters are individually defined by a unit of the segment. That is, a modulation and an error correction code are applied in a unit of each segment within a channel band, to support three kinds of hierarchical transmissions.

However, in the BST-OFDM system, it is not considered an operation in an FM frequency band, and furthermore, since it is the transmission system integrated with the digital television transmission system, there is a problem that a complication extent in a system implementation is too serious to select it only for the sake of the digital audio broadcasting service. Therefore, in a nation in which the DTV system was already decided, like a case of Republic of Korea, there is a problem that an introduction of the BST-OFDM system developed to support both television and audio broadcasting is actually impossible.

SUMMARY OF THE INVENTION

Accordingly, the present invention is directed to an in-band adjacent-channel digital audio broadcasting system that substantially obviates the limitations and disadvantages of the related art.

An object of the present invention is to provide an in-band adjacent-channel digital audio broadcasting transmission system, in which it is no need to ensure a new frequency band to operate in the existing FM frequency band, and a spectrum use efficiency is maximized by applying an OFDM and a higher order modulation, to thereby provide a high quality audio of multichannel and data service.

In accordance with an aspect of the present invention for achieving the present invention, a digital audio broadcasting transmission system based on an in-band adjacent-channel type includes a scrambling unit for scrambling a signal to be broadcasted, thereby generating a scrambled signal; an outer coding unit for performing a first encoding of the scrambled signal, thereby generating an outer encoded signal; an outer interleaving unit for performing a first interleaving of the outer encoded signal a byte by byte basis, thereby generating an outer interleaved signal; an inner coding unit for performing a second encoding the outer interleaved signal, thereby generating an inner encoded signal; an inner interleaving unit for performing a second interleaving of the inner encoded signal, thereby generating an inner interleaved signal; a modulating unit for modulating the inner interleaved signal, thereby generating an orthogonal frequency division multiplexing (OFDM) symbols; a guard interval inserting unit for inserting a guard interval between the OFDM symbols in order to eliminate an inter-symbol interference, thereby generating an OFDM frame; and an RF processing unit for performing a conversion of the OFDM frame into an analog radio frequency signal so that the OFDM signal can be transmitted in a specific frequency channel of an FM frequency band, and for amplifying and outputting the analog radio frequency signal.

In the inventive in-band adjacent-channel digital audio broadcasting, in order to ensure a disposition of digital signal spectrum for utilizing frequency resources which is not occupied by an analog channel (Channel bandwidth in mono and stereo are respectively 180 kHz and 260 kHz) within an FM frequency band (88~108 MHz), and a strongness of a digital signal on multipath fading channel with the existing analog signal, there are characteristics such as a concatenated channel coding method, an interleaving method based on various types, and the construction of a transmission frame capable of omitting a synchronizing work between respective modules constructing a demodulator and a efficient pilot input pattern for a channel estimation/compensation and a synchronization.

BRIEF DESCRIPTION OF THE DRAWINGS

Other objects and aspects of the invention will become apparent from the following description of the embodiments with reference to the accompanying drawings, in which:

FIG. 13 is a diagram for explaining a bit inversion relation of a positional index applied in a time interleaving;

FIG. 15 provides a diagram for explaining a frequency interleaving method for useful sub-carriers within an OFDM symbol;

FIG. 20 illustrates a diagram for a position of TPSs within an OFDM symbol;

FIG. 21 depicts a diagram for explaining a meaning and a representation format of TPS information transmitted within an OFDM frame;

FIG. 22 is a diagram of a procedure for guiding a correlation between the number of useful sub-carriers constructing an OFDM sub-frame and the number of RS coded packets;

FIG. 23 is a diagram of a procedure for guiding a correlation between the number of useful sub-carriers constructing an OFDM sub-frame and the number of M blocks deciding a time interleaving depth;

FIG. 25 furnishes a diagram for explaining a system parameter of an in-band adjacent-channel digital audio broadcasting;

DESCRIPTION OF THE PREFERRED EMBODIMENT

Reference will now be made in detail to the preferred embodiments of the present invention, examples of which are illustrated in the accompanying drawings. Additional objects, characteristics and operational advantages to the inventive object, operation and effect will be more apparent through a description for the preferred embodiments.

For reference, the embodiment disclosed in the following are just provided by selecting the most preferred embodiment out of various kinds of embodiments, for the sake of a understanding of those skilled in the art. Therefore, it will be apparent to those skilled in the art that various controls and variations can be made in the present invention without deviating from the spirit or scope of the invention. Thus, it is intended that the present invention cover the controls and variations of this invention provided they come within the scope of the appended claims and their equivalents.

Figure 1:
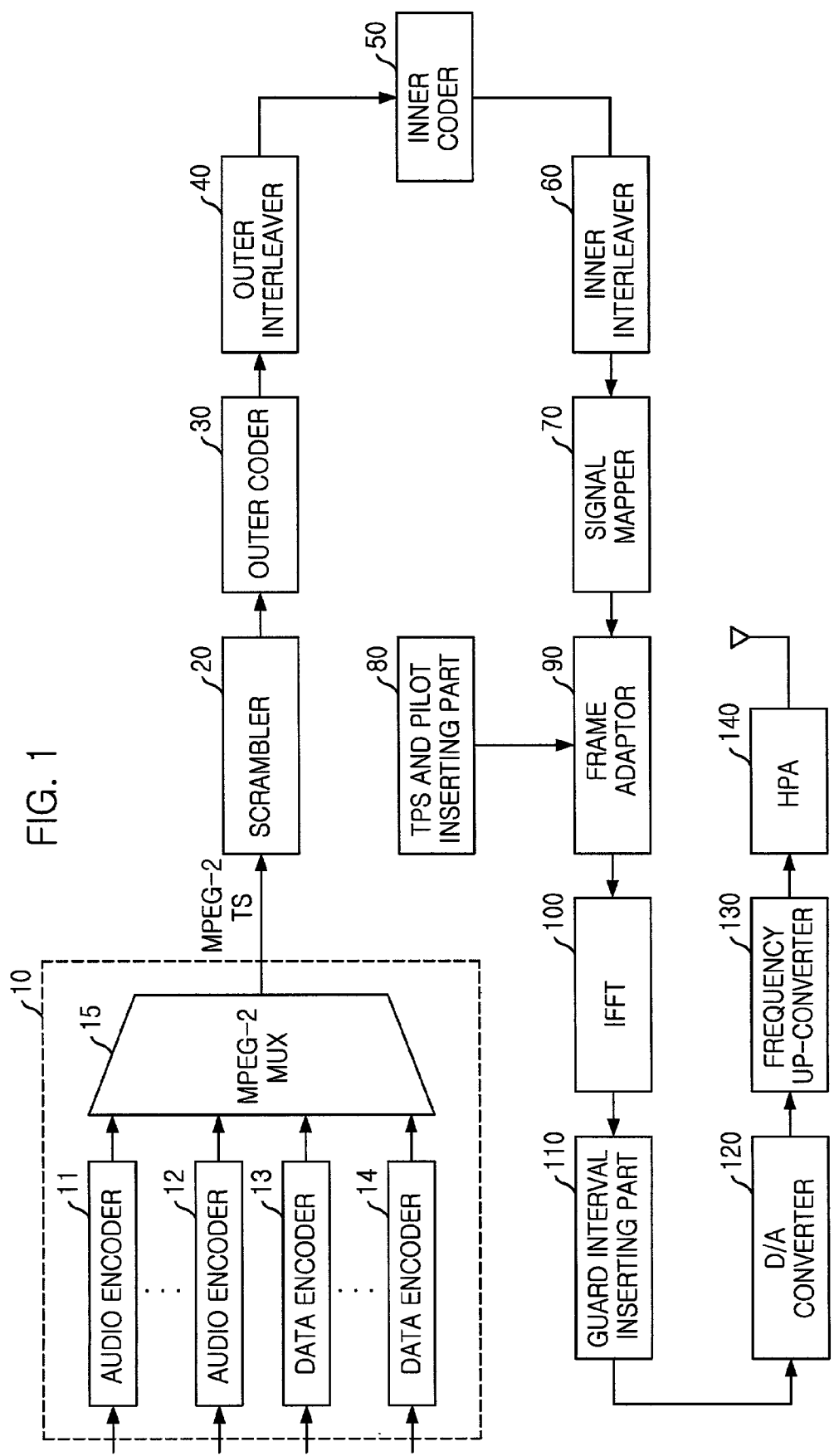
FIG. 1 is a block diagram for an in-band adjacent-channel digital audio broadcasting in one embodiment of the present invention.

In accordance with the present invention, as shown in FIG. 1, an in-band adjacent-channel digital audio broadcasting system of the preferred embodiment is constructed with a source coding part 10, an energy dispersal scrambler 20 for dispersing energy of a RF signal, an outer encoder 30 for an RS encoding, an outer interleaver 40 for interleaving an MPEG-2 TS packet based on a unit of 204 byte which starts as a synchronization word or an inverted synchronization word by using a convolutional byte-wise interleaver, an inner encoder 50 capable of varying and applying a convolutional encoder and a trellis encoder, an inner interleaver 60 for converting a burst error into random errors in time and frequency domain, a signal mapper 70 for modulation using 16-QAM, 8-PSK signal constellations heightening a use efficiency of spectrum and ensuring a sufficient data rate; a frame adaptor 90 for constructing a transmission frame by TPSs, pilot samples and data samples, the IFFT 100 for generating OFDM symbols, a guard interval inserting part 110 for inserting a guard interval in order to remove an inter-symbol interference (ISI), a D/A converter 120 for converting digital signal into an analog signal, a frequency up-converter 130 for performing a frequency up-conversion so that a baseband analog signal is transmitted in a specific frequency channel of an FM frequency band, and a high power amplifier (HPA) 140 for amplifying an RF signal.

In such construction, an operation in the inventive digital audio broadcasting system based on the in-band adjacent-channel is described as follows.

When the analog audio signal and the additional data such as multimedia information, stock information, traffic information, GPS information, facsimile information, and wide-band call information etc. are inputted, it is compressed and encoded by audio encoders 11, 12 and data encoders 13, 14 of a source coding part 10.

The audio encoders 11, 12 are not restricted by a specific audio coding system since it is not considered an unequal error protection (UEP) in a channel coding part, thus the audio encoders 11, 12 basically has an advanced audio coding (AAC) system capable of ensuring a CD audio quality in a high compression rate. It is available to select various types of coding systems according to an audio quality of an audio program to be provided, but in a case of considering several kinds of audio coding systems, it may become burden in embodying an audio decoder. A standard of the data encoder is not decided herewith, and it can be specifically decided according to the data service to be provided in future. An output of the afore-mentioned audio and data encoder is multiplexed to an MPEG-2 transport stream, and then is transmitted to a modulation part.

Data inputted from the each source encoder part 10 is converted into the transport stream by an MPEG-2 multiplexer 15, and is outputted to the scrambler 20 for the sake of an energy dispersal of a transmission signal.

Figure 2:
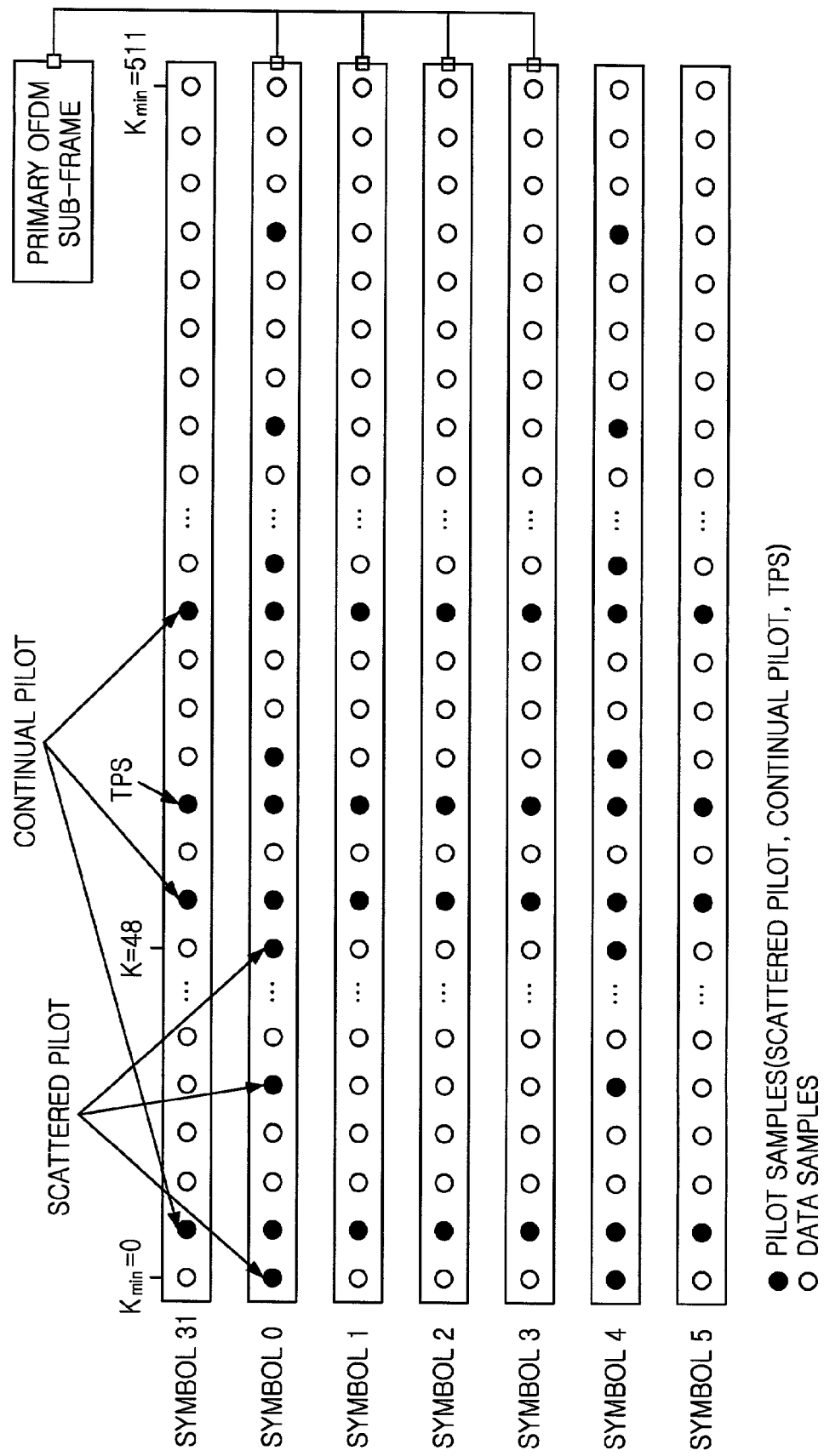
FIG. 2 is a structure diagram of an OFDM symbol constructed by data, continual pilots, scattered pilots and TPS samples.

The outer encoder 30 for the RS encoding, the outer interleaver 40 for a convolutional byte-wise interleaving, the inner encoder 50 for the convolutional encoding and trellis encoding, the inner interleaver 60, and the signal mapper 70, and herewith, a continual and scattered pilot and TPS (Transmission Parameter Signaling) carrier are added thereto, to construct the OFDM symbol as shown in FIG. 2. Such procedure is described in detail, as follows.

Figure 5:
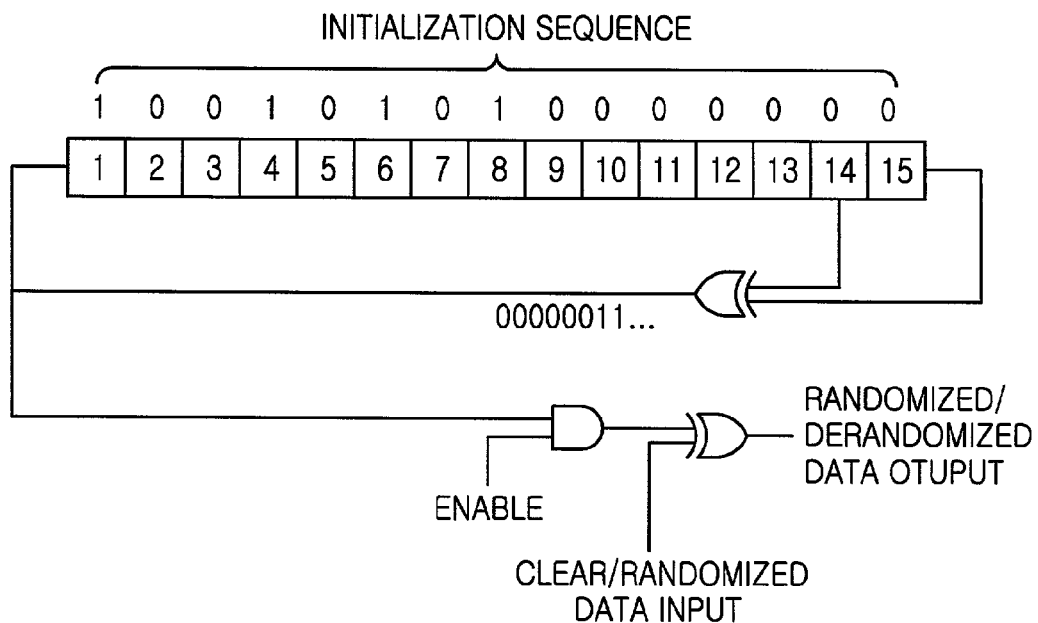
FIG. 5 represents a structure diagram of a scrambler for an energy dispersal process.

The polynomial for the scrambler 20, e.g., the Pseudo Random Binary Sequence (PRBS) generator shall be: $1+X^{14}+X^{15}$. Loading of the sequence "100101010000000" into the PRBS registers, as indicated in FIG. 5, shall be initiated at the start of every eight transport packets.

To provide an initialization signal for the descrambler, the MPEG-2 sync byte of the first transport packet in a group of eight packets is bit-wise inverted from $47_{HEX}$ to $B8_{HEX}$. This process is referred to as "transport multiplex adaptation" (see FIG. 6). The first bit at the output of the PRBS generator 20 shall be applied to the first bit (i.e. MSB) of the first byte following the inverted MPEG-2 sync byte (i.e. $B8_{HEX}$). To aid other synchronization functions, during the MPEG-2 sync bytes of the subsequent 7 transport packets, the PRBS generation shall continue, but its output shall be disabled, leaving these bytes unrandomized. Thus, the period of the PRBS sequence shall be 1503 bytes. The randomization process shall be active also when the input bit-stream of the modulator is non-existent, or when it is non-compliant with the MPEG-2 transport stream format (i.e. 1 sync byte+187 packet bytes).

Figure 6:
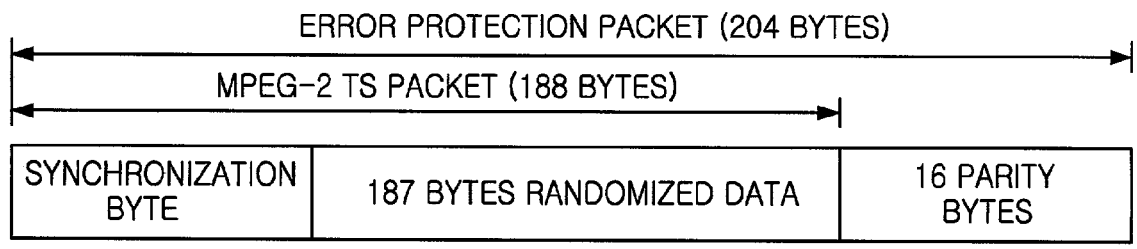
FIG. 6 is a structure diagram of an MPEG-2 transmission stream packet coded by shortened Reed-Solomon code (204, 188, t=8)
Figure 7:
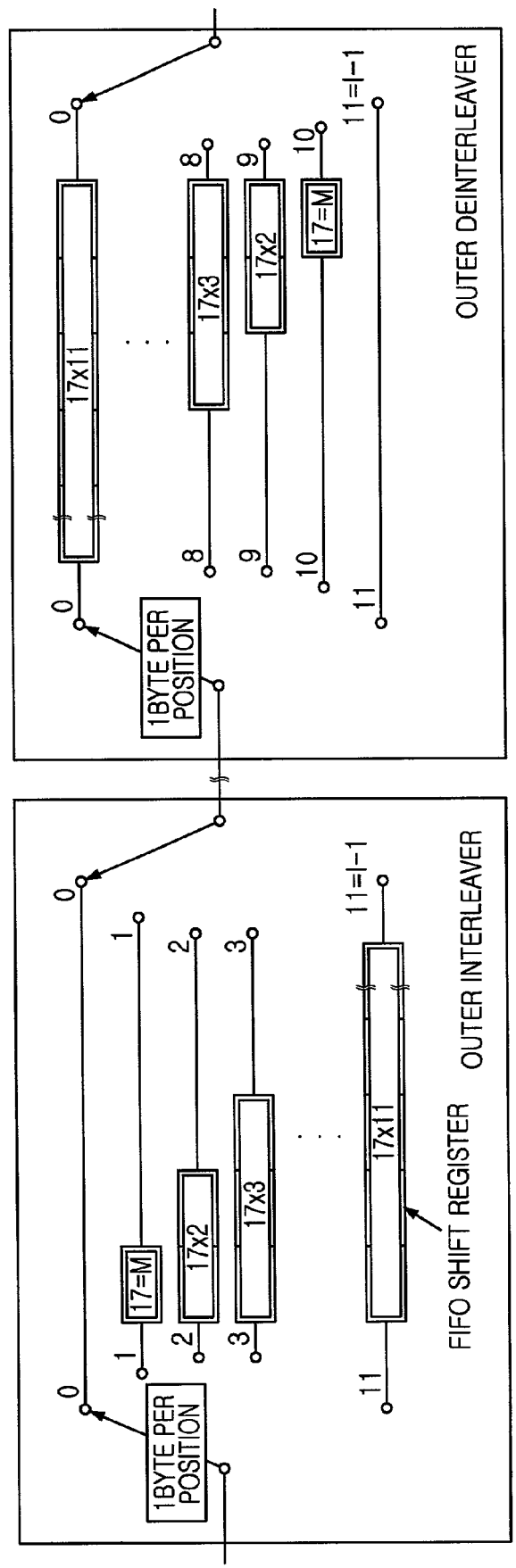
FIG. 7 is a diagram for showing the structure of convolutional byte-wise interleaver and deinterleaver.

The outer coding shall be performed on the input packet structure as illustrated in FIG. 6. Reed-Solomon (204, 188, t=8) shortened code, derived from the original systematic RS (255, 239, t=8) code, shall be applied to each randomized transport packet (188 byte). Reed-Solomon coding shall also be applied to the packet sync byte, either non-inverted (i.e. $47_{HEX}$) or inverted (i.e. $B8_{HEX}$).

Code Generator Polynomial:

$$g(x)=(x+\lambda^0)(x+\lambda^1)(x+\lambda^2)\ldots(x+\lambda^{15})$$

where $\lambda=02_{HEX}$

Field Generator Polynomial:

$$p(x)=x^8+x^4+x^3+x^2+1$$

The shortened Reed-Solomon code may be implemented by adding 51 bytes, all set to zero, before the information bytes at the input of an RS (255, 239, t=8) encoder. After the RS coding procedure these null bytes shall be discarded, leading to a RS code word of N=204 bytes.

The conceptual scheme of outer interleaver 40, convolutional byte-wise interleaving with depth I=12 shall be applied to the error protected packets. This results in the interleaved data structure. The interleaved data bytes shall be composed of error protected packets and shall be delimited by inverted or non-inverted MPEG-2 sync bytes (preserving the periodicity of 204 bytes). The interleaver may be composed of I=12 branches, cyclically connected to the input byte-stream by the input switch. Each branch j shall be a First-In, First-Out (FIFO) shift register, with depth j×M cells where M=17=N/I, N=204. The cells of the FIFO shall contain 1 byte, and the input and output switches shall be synchronized. For synchronization, the SYNC bytes and the SYNC bytes shall always be routed in the branch "0" of the interleaver.

Figure 8:
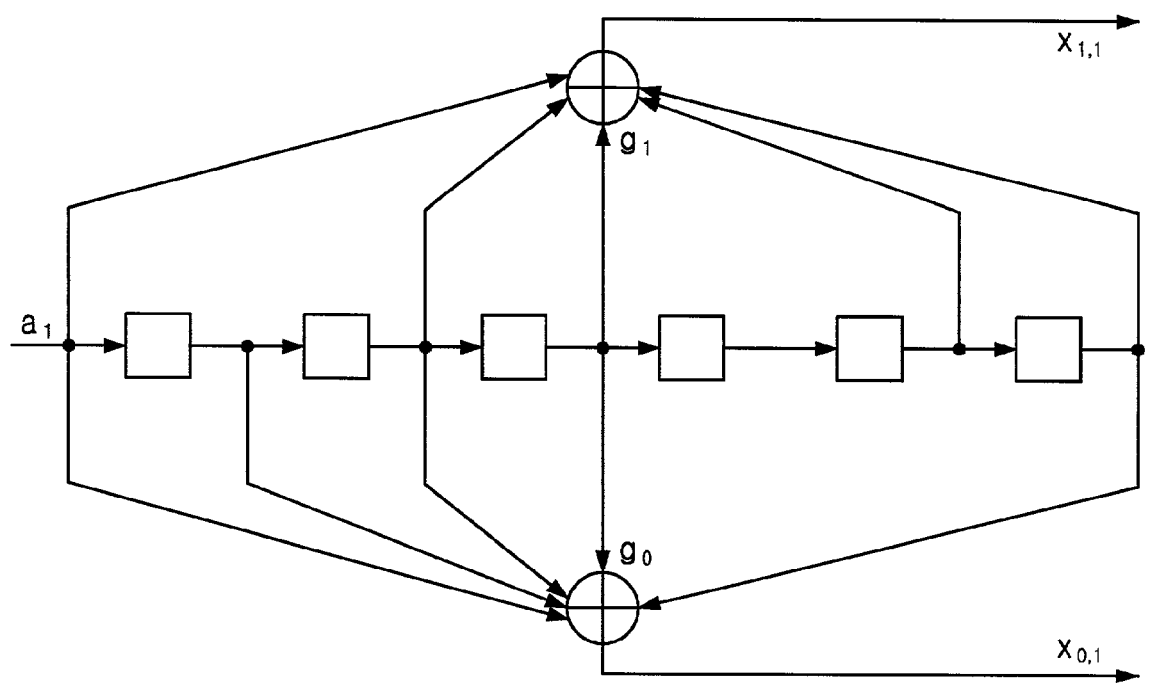
FIG. 8 is a diagram for showing the structure of a convolutional encoder in which a code rate is 1/2 and a constraint length is 7.

The inner encoder 50 can be applied by varying the convolutional encoder and the trellis encoder. In this convolutional code, it is applied a coding rate of FIG. 8, 1/2, and a code of constraint length (K) 7. The polynomial ($g_0$, $g_1$) generating a code symbol ($x_{0,i}$, $x_{1,i}$) are $171_{oct}$, $133_{oct}$.

Generator Polynomial:

$$g_0(x)=1+x+x^2+x^3+x^6$$

$$g_1(x)=1+x^2+x^3+x^5+x^6$$

An initial state of the convolutional encoder has a value of all '0'. After the initialization, a firstly coded output is a bit coded by the generation polynomial ($g_0$). The convolutional encoder performs a modulo-2 addition for tabs selected among data sequences delayed in time continuously.

The trellis encoder has the mutually different structure according to the constraint length K and the signal mapper 70 of applied 8PSK and 16QAM, and the transmission scheme having an application of the trellis encoder is a TCOFDM Trellis Coded Orthogonal Frequency Division Multiplexing).

The TCOFDM has a merit of increasing a data rate by 1.3 times in a case of 8PSK and by 1.5 times in a case of 16QAM, in comparison with the COFDM Coded-OFDM) having an application of the convolutional code, and can ensure more prominent performance according to the increase of constraint length.

Figure 9:
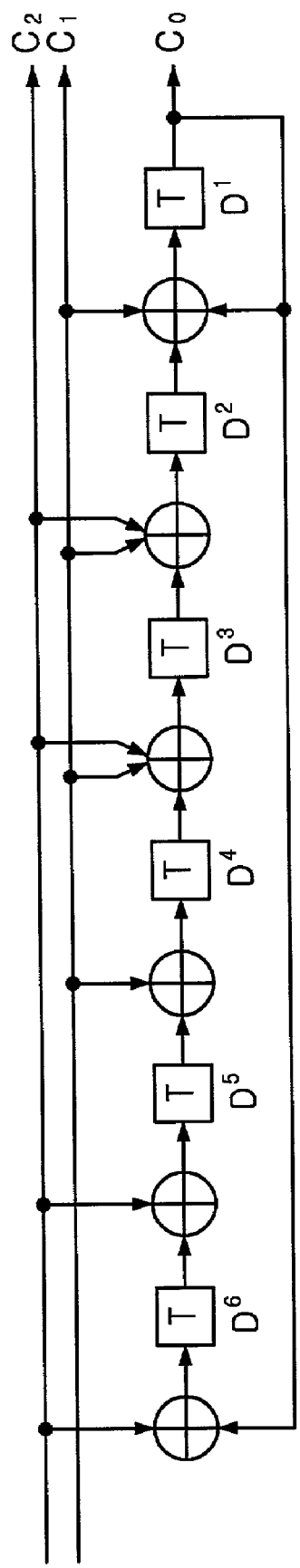
FIG. 9 sets forth a diagram for providing the structure and a parity check polynomial of a trellis encoder in which a code rate is 2/3 and a constraint length is 7.
Figure 10:
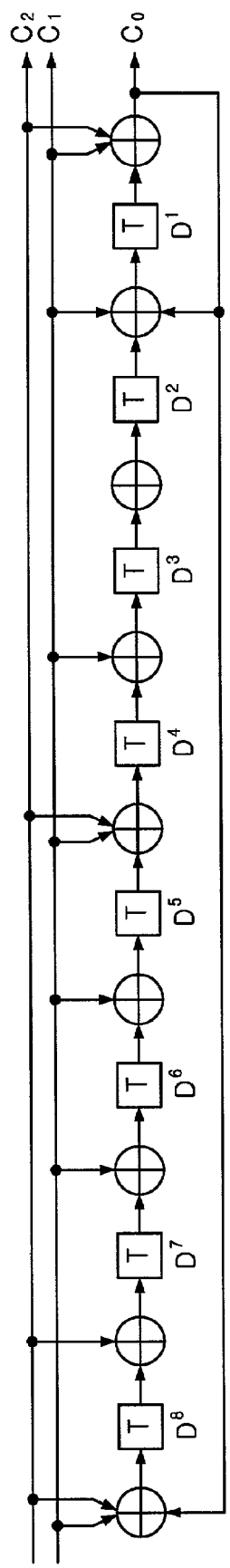
FIG. 10 represents a diagram for providing the structure and a parity check polynomial of a trellis encoder in which a code rate is 2/3 and a constraint length is 9.

To realize the 8 PSK TCOFDM system, the system is constructed so as to variably apply a code which has a parity-check polynomial based on the structure of each of FIGS. 9 and 10, and has constraint length 7 and 9.

Figure 11:
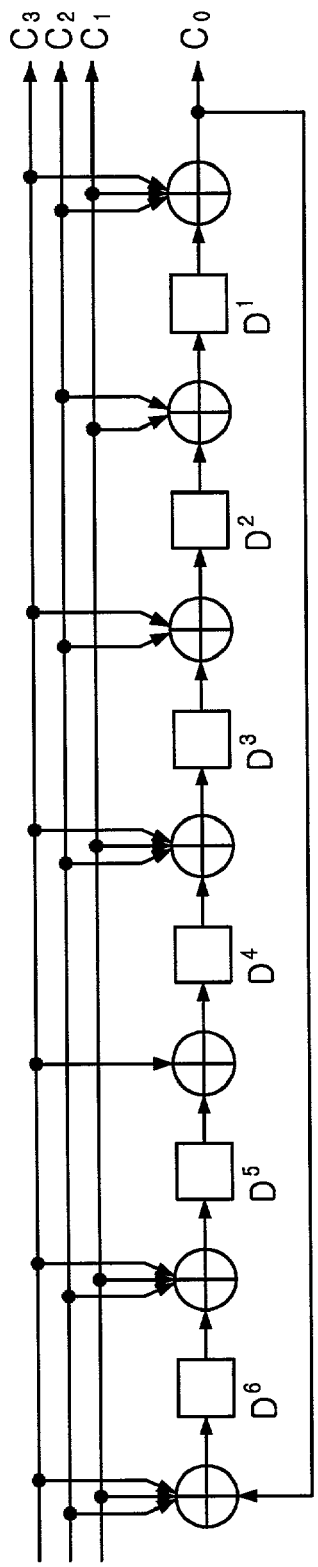
FIG. 11 illustrates a diagram for representing the structure and a parity check polynomial of a trellis encoder in which a code rate is 3/4 and a constraint length is 7.
Figure 12:
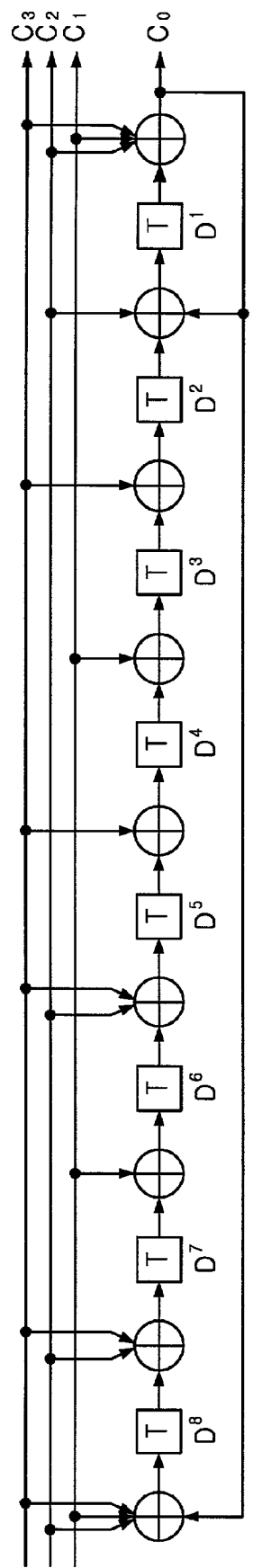
FIG. 12 shows a diagram for representing the structure and parity check polynomial of a trellis encoder in which a code rate is 3/4 and a constraint length is 9.

Likewise, further, in a case of the 16QAM TCOFDM system, it can be applied a code which has a parity-check polynomial based on the structure of each of FIGS. 11 and 12, and has the constraint length 7 and 9.

The inner interleaver 60 is constructed with a time interleaver and a frequency interleaver.

Figure 14:
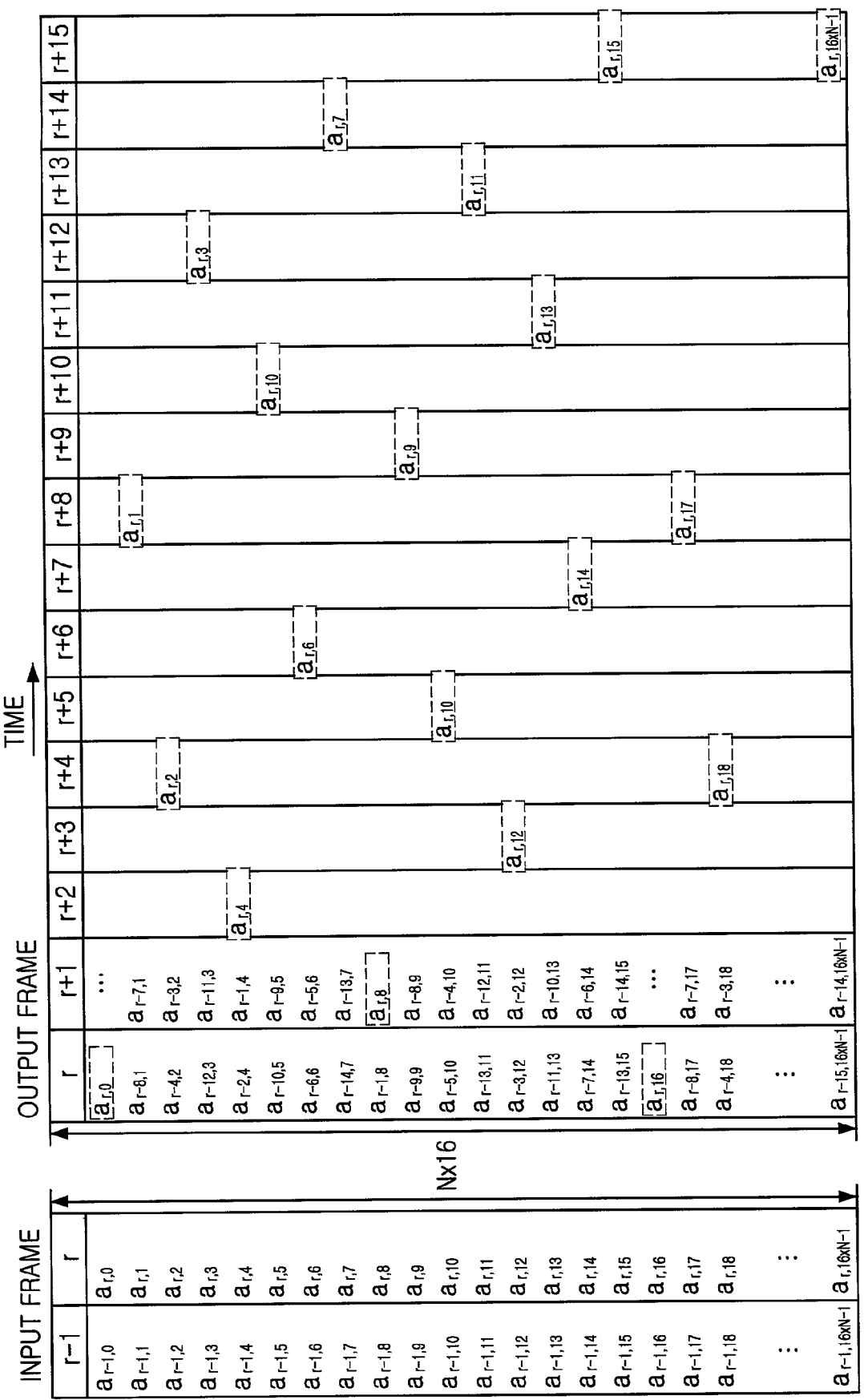
FIG. 14 is a diagram for explaining a frame delay for a time interleaving.

Time interleaving shall be applied to the output of each convolutional encoder. The output of convolutional encoder is a sequence of convolutional codewords denoted as ar where r is defined as the time index. The time index is introduced for the purpose of describing system properties of the absolute time. The output of the interleaver is denoted as a sequence ar' where r' is defined as the time index. The relationship between the indices r', r and i is specified in FIG. 13, where r' is given as a function of r for each of the possible values of i modulo 16; r'=r−f(i). FIG. 14 illustrates the time interleaving rule.

The purpose of the symbol interleaver is to map 4 or 3 bit words onto the 512 active carriers per OFDM symbol. The symbol interleaver acts on blocks of 512 data symbols.

The frequency interleaver performs an interleaving for useful sub-carrier excepting of sub-carrier having a pilot and TPS, among sub-carriers of the 512 numbers that construct one OFDM symbol. In a case of the inventive in-band adjacent-channel digital audio broadcasting, each OFDM symbols constructing the OFDM sub-frame of FIG. 2 is constructed by two kinds of useful sub-carriers of the 366 and 490 numbers.

First, it is defined A(i) permutation for the sub-carrier of the 512 number.

On the basis of it, B(j) and C(k) are defined for the interleaving on the effective sub-carrier of the 366 and 490 number, as follows, and an order of the interleaving is as FIG. 15.

Figure 16:
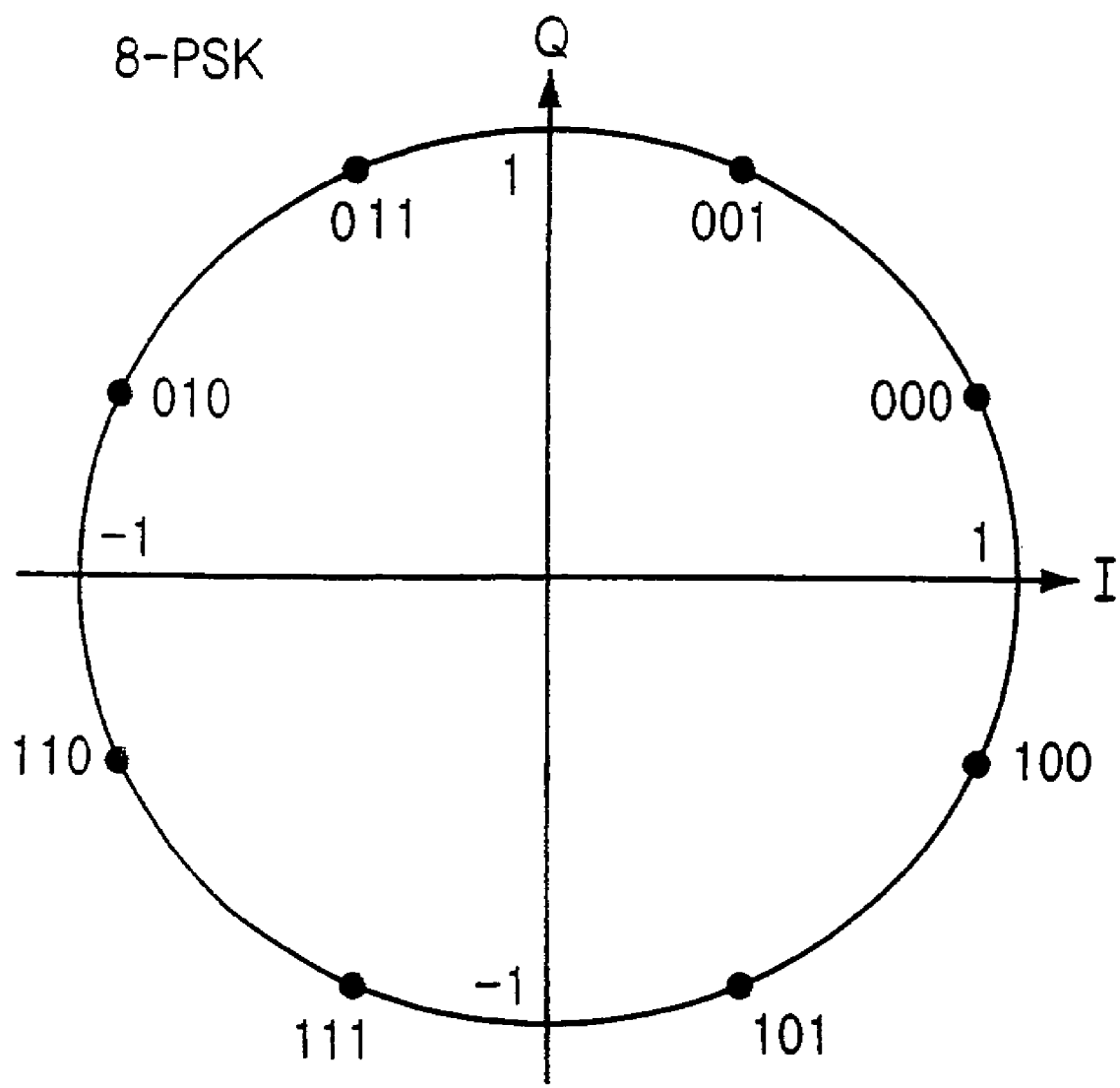
FIG. 16 furnishes a diagram for a signal constellation of 8PSK.
Figures 17, 18:
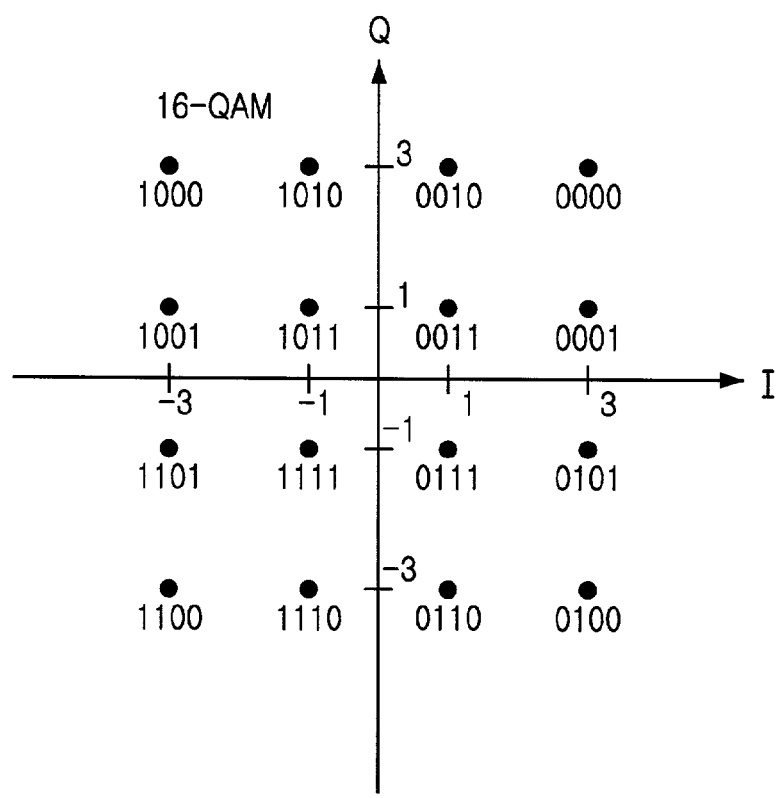
FIG. 17 represents a diagram for a signal constellation of 16QAM.
FIG. 18 is a diagram showing a position of continual pilots within an OFDM symbol.

$A(i)=[13 \cdot A(i-1)+127] \pmod{512}$ and $A(0)=0$; for $i=1, 2, \ldots, 511$ $B(j)=[A(i)-73]$, if $73 \% A(i)<439$; for $i=0, 1, 2, \ldots, 511$ $C(k)=[A(i)-11]$, if $11 \% A(i)<501$; for $i=0, 1, 2, \ldots, 511$ All data carriers in one OFDM frame are modulated using either 16-QAM, 8-PSK constellations by the signal mapper 70. The constellations, and the details of the Gray mapping applied to them, are illustrated in FIGS. 16 and 17.

The transmitted signal is organized in frames by frame adaptor 90. Each frame includes 8 OFDM symbols. Four frames constitute one super-frame. Each symbol is constituted by a set of K=512 carriers. The symbol is composed of two parts a useful part and a guard interval. The guard interval includes a cyclic continuation of the useful part and is inserted before it. The symbols in an OFDM frame are numbered from 0 to 8. All symbols contain data and reference information. Since the OFDM signal includes many separately modulated carriers, each symbol can in turn be considered to be divided into cells, each corresponding to the modulation carried on one carrier during one symbol. In addition to the transmitted data an OFDM frame contains by scattered pilot, continual pilot and TPS carriers. The pilots can be used for frame synchronization, frequency synchronization, time synchronization, channel estimation, transmission mode identification and can also be used to follow the phase noise. The carriers are indexed by k [$K_{min} \sim K_{max}$] and determined by $K_{min}=0$ and $K_{max}=512$.

The scattered pilot is used for a channel compensation, a fine FFT window position offset estimation and a sampling clock synchronization, and as shown in FIG. 2, 128 sub-carriers are placed on a position to be defined in the following expression, only in a first OFDM sub-frame within the OFDM sub-frames.

Scattered pilot position:

$\{k=K_{min}+4p\,?\,0\%p<128\}$

Reference information, taken from the reference sequence, is transmitted in scattered pilot cells in every symbol. The scattered pilots are always transmitted. Thus the corresponding modulation is given by:

$Re\{C_{m,l,k}\}=4/3\times2(1/2-\omega_k)$ $Im\{C_{m,l,k}\}=0$

Where m is the frame index, k is the frequency index of the carriers and l is the time index of the symbols. For the symbol of index l, the carrier denoted by the index k belongs to the subset. The pilot insertion pattern is shown in FIG. 2.

In addition to the scattered pilots described above, 15 continual pilots are inserted according to FIG. 18.

Figure 19:
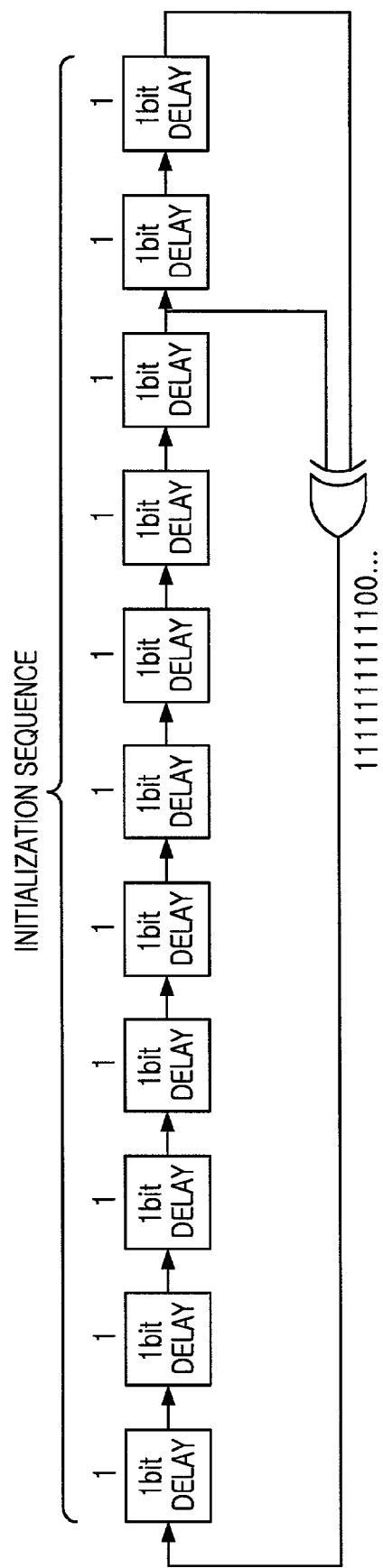
FIG. 19 is a structure diagram showing an operation of a PRBS (Pseudo Random Binary Sequence) generator for the sake of a modulation of a pilot signal.

The continual and scattered pilots are modulated according to a PRBS sequence, $\omega_k$, corresponding to their respective carrier index k. This sequence also governs the starting phase of the TPS information. The PRBS sequence is generated according to FIG. 19. The PRBS is initialized so that the first output bit from the PRBS coincides with the first active carrier. A new value is generated by the PRBS on every used carrier.

The polynomial for the PRBS generator shall be expressed as:

$g(x)=x^{11}+x^2+1$

Reference information, taken from the reference sequence, is transmitted in continual pilots in every symbol. Continual pilots are always transmitted at the boosted power level.

Thus the corresponding modulation is given by:

$Re\{C_{m,l,k}\}=4/3\times2(1/2-\omega_k)$ $Im\{C_{m,l,k}\}0$

Where m is the frame index, k is the frequency index of the carriers and l is the time index of the symbols.

The TPS carriers are used for signaling parameters related to the transmission scheme, i.e. to channel coding and modulation. The TPS is transmitted in parallel on 7 TPS carriers. Every TPS carrier in the same symbol conveys the same differentially encoded information bit. The indices of the TPS carriers contained are in FIG. 20. The transmission parameter information shall be transmitted as shown FIG. 21. The leftmost bit is sent first.

The TPS are transmitted at the normal power level, i.e., they are transmitted with an energy equal to that of the mean of all data cells, i.e., $E[c\times c^*]=1$. Every TPS carrier is DBPSK modulated and conveys the same message. The DBPSK is initialized at the beginning of each TPS block. The following rule applies for the differential modulation of the TPS pilot on the carrier k of the symbol l (l>0) in the frame m:

–If $s_l=0$, $Re\{C_{m,l,k}\}=Re\{C_{m,l-1,k}\}$; $Im\{C_{m,l,k}\}=0$

–If $s_l=1$, $Re\{C_{m,l,k}\}=-Re\{C_{m,l-1,k}\}$; $Im\{C_{m,l,k}\}=0$

The absolute modulation of the TPS carriers in the first symbol in a frame is derived from the reference sequence $\omega_k$ as follows:

$Re\{C_{m,0,k}\}=2(\omega_k-1/2)$ $Im\{C_{m,0,k}\}=0$

The first bit of the TPS information, $s_0$, is an initialization bit for the differential BPSK modulation. The modulation of the TPS initialization bit is derived from the PRBS. Bits 1 to 8 of the TPS are a synchronization word.

Next 4 bits ($s_9$~$s_{12}$) of the TPS information is used as a TPS length indicator to signal, which represents the number of used bits of the TPS. This length indicator has the value $s_9$~$s_{12}$=1001 at present.

Next 2 bits ($s_{13}$~$s_{14}$) of the TPS information is used as a frame number indicator. Four frames constitute one super-frame. The frames inside the super-frame are numbered from 0 to 3 as illustrated in FIG. 21.

Next 2 bits ($s_{15}$, $s_{16}$) of the TPS information represents the number of M blocks constructing the time interleaver according to a signal mapping system and an interleaving depth.

The constellation shall be signaled by 1 bit($s_{17}$) as shown in FIG. 21.

The 21 bits ($s_1$–$s_{21}$) containing the TPS synchronization and information are extended with 10 parity bits of the BCH(31, 21, t=2) code. A code generator polynomial is expressed as:

$g(x)=x^{10}+x^9+x^8+x^6+x^5+x^3+1$.

Figure 3:
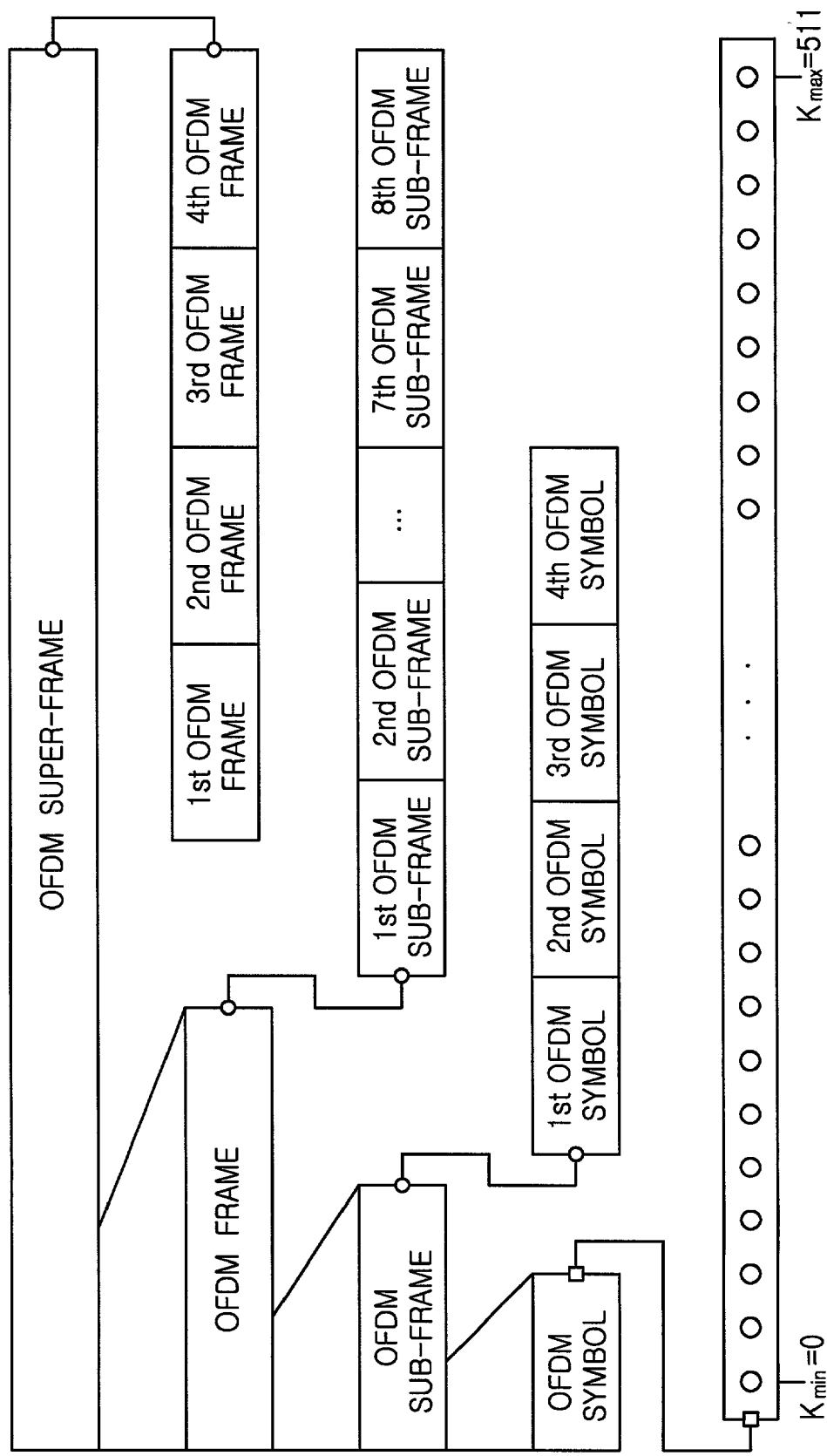
FIG. 3 shows a structure diagram of a transmission frame for an in-band adjacent-channel digital audio broadcasting.

The inventive in-band adjacent-channel digital audio broadcasting system uses has an application of the transmission frame structure as illustrated in FIG. 2 or FIG. 3, and it is decided as follows, to get an efficient synchronizing between respective modules constructing a reception terminal.

An insertion position of the above-described scattered pilot is not constant every the OFDM symbol as shown in FIG. 2. One OFDM sub-frame organized by four OFDM symbols has the number of constant useful sub-carriers as the 1,836 numbers, and is calculated as follows.

The number of useful sub-carriers of 1st *OFDM* symbol $= 512 - ($scattered pilot$(128) + $continual pilot$(15) + TPS(7)) +$ (continual pilot $\cap$ scattered pilot)

$= 512 - (128 + 15 + 7) + 4 = 512 - 150 + 4$ $= 366$

The number of useful sub-carriers 2nd–4th *OFDM* symbols $= 512 - ($continual pilot$(15) + TPS(7)) = 512 - 22$ $= 490$ The number of useful sub-carriers per 1 *OFDM* sub-frame $= 366 + 490 \times 3 = 1,836$ The number of OFDM symbols constructing the OFDM frame should be equal to the number of TPS information bits to be transmitted, and according to that, each OFDM frame is constructed by 32 OFDM symbols or 8 OFDM sub-frames. The OFDM super-frame is constructed by 4 OFDM frames, thus each super-frame has the total 128 OFDM symbols or 32 sub-frames.

One out of considerable terms in deciding the transmission frame is the number of RS packets for constructing the super-frame, and herewith, the RS packets of the integer number should be contained every the OFDM super-frame so that the synchronizing work can become easy in the reception terminal.

In order to decide the structure of the OFDM super-frame, it is searched a correlation between the useful data sample number as the effective sub-carrier number per a sub-frame as illustrated in FIG. 22, and the RS packet number based on the signal constellation (16QAM, 8PSK). Among them, underlined portions in FIG. 22 correspond to a case for satisfying a condition of the useful data sample number per the OFDM sub-frame of optional integer times which simultaneously equals to the data sample number per the RS packet of optional integer times based on 16QAM and 8PSK signal mapping. It means that a 1836×16 term corresponding to a case of the minimum value ŋ satisfying the condition in FIG. 22, namely, the integer times of 64 OFDM symbols constructs the super-frame, to thus enable to contain the RS packet of the integer number. Therefore, an efficient synchronizing work in the outer deinterleaver of a receiver, the RS decoder and the descrambler can be performed. The number of RS packets contained per the OFDM super-frame according to the signal mapping is 54 in 8PSK and 72 in 16QAM, and first byte data should be synchronization byte of MPEG-2 packet.

On the basis of that, the structure of a final super-frame is decided by considering the number of M blocks for deciding a logical frame size of a time interleaver to be described later, and the TPS information bit number. One out of considerable terms in deciding the transmission frame is to decide the number of M blocks for deciding the interleaving depth, and at this time, the M blocks of the integer number should be contained by a unit of the OFDM super-frame so as to become easy in the synchronizing work in the reception terminal.

Figure 23:
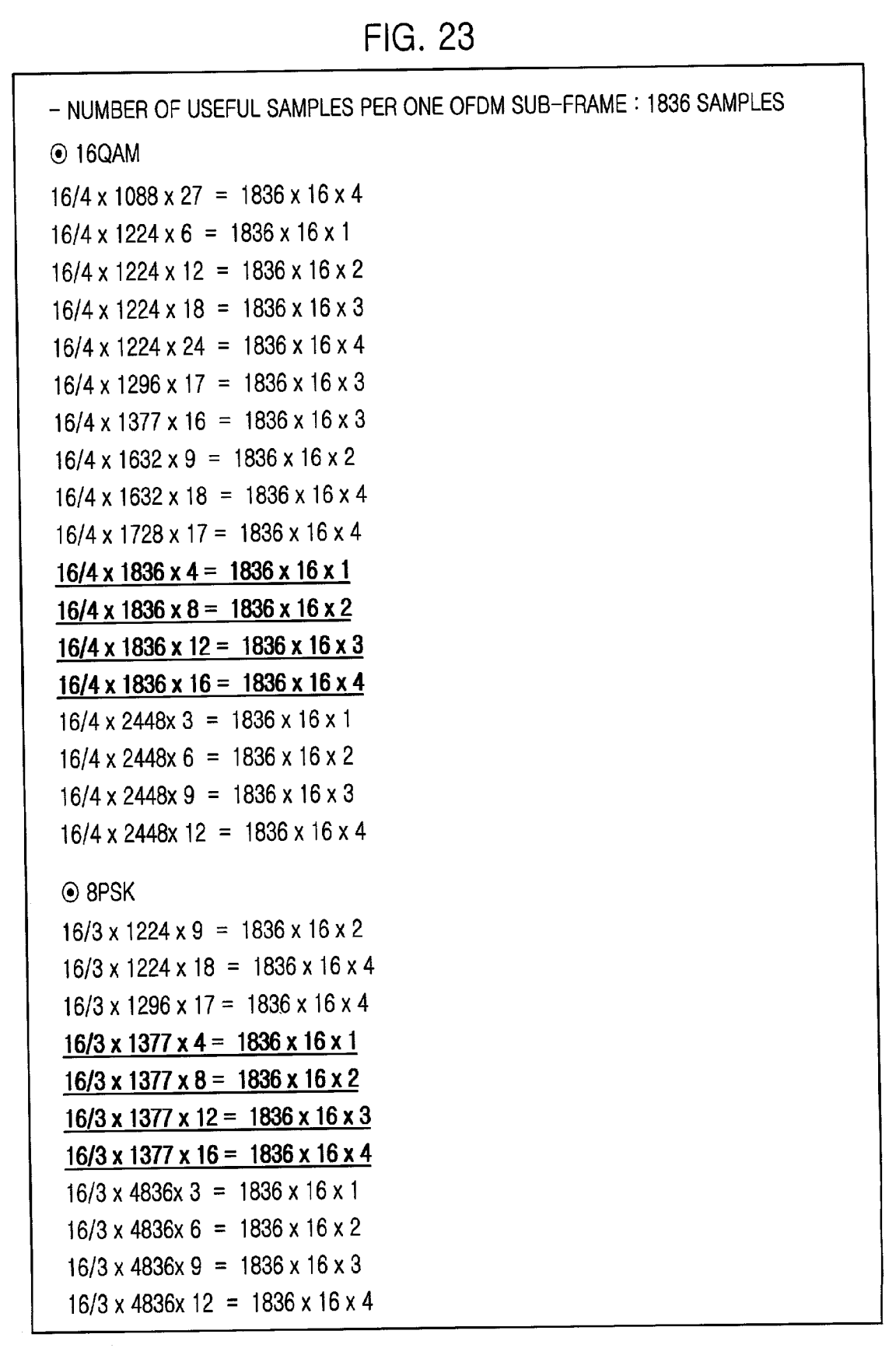

For it, it is gained a result of FIG. 23 for representing a correlation between the sample number (1836×16) as a constructive reference of the OFDM super-frame obtained above, and the M block number based on the constellation (16QAM, 8PSK). Among them, the underlined portion corresponds to a case for satisfying a condition that the sample number (1836×16) as the constructive reference of the OFDM super-frame and the M block number based on the constellation (16QAM, 8PSK) coincides with each other simultaneously.

Each transmission frame is inputted to the IFFT part 100, and is converted into a signal of a time area. The OFDM symbols respectively constructed with the 512 sub-carriers, which construct the transmission frame, have an application of 2048 IFFT and are converted into an intermediate frequency (IF) signal of about 1446 kHz.

Figure 24:
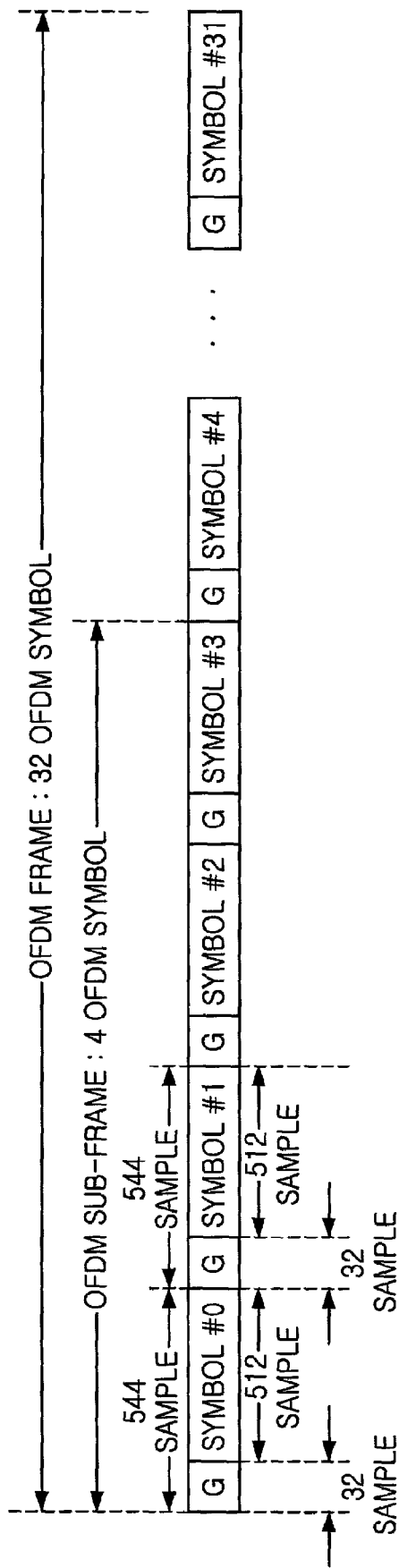
FIG. 24 offers a structure diagram of an OFDM frame including an insertion of a guard interval.

Next, a guard interval is inserted in the guard interval inserting part 110 to eliminate the inter-symbol interference (ISI), and this is provided to remove the ISI by multipath fading. Herewith, as shown in FIG. 24, 32 data samples (the guard interval) identical to that at the end of each OFDM symbol are copied on the front thereof.

Then, the data samples constructing the respective OFDM symbol are converted into the analog signal through the D/A converter 120.

The frequency up-converter 130 performs a frequency up-conversion to transmit the IF signal in a specific frequency channel of an FM frequency band (88~108 MHz).

Figure 4:
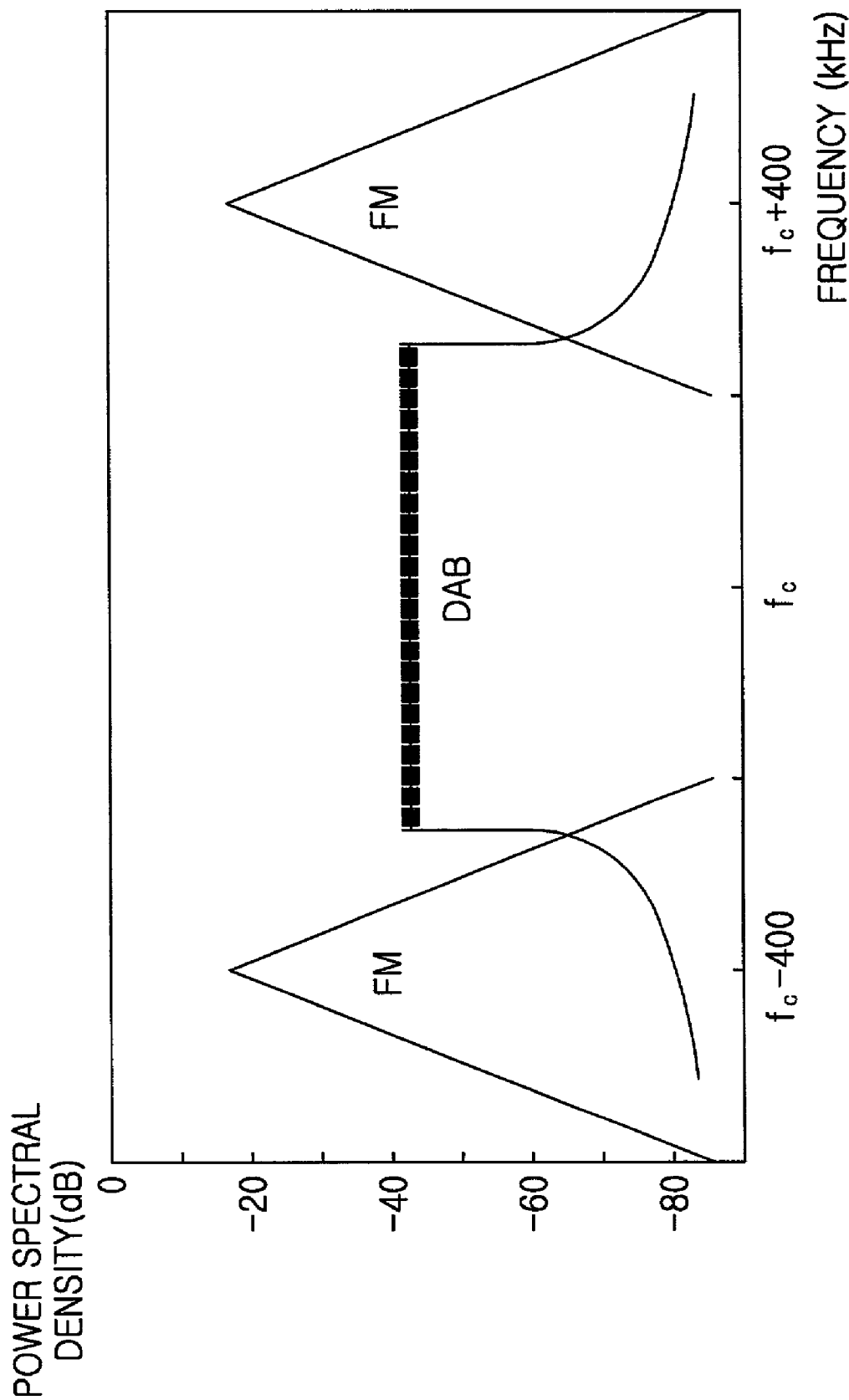
FIG. 4 indicates a disposition diagram for a frequency spectrum of an in-band adjacent-channel digital audio broadcasting signal and an FM signal.

Subsequently, the high power amplifier (HPA) 140 amplifies an RF signal converted by a frequency up-converter, and outputs it. The digital audio broadcasting signal amplified through the high power amplifier 140 is transmitted in a type of FIG. 4 through an antenna in the frequency area. At this time, the maximum PSD (Power Spectral Density) level of the digital audio broadcasting signal may be transmitted lower by more 25 dB than the peak PSD level of the FM signal in frequency domain.

Figure 26:
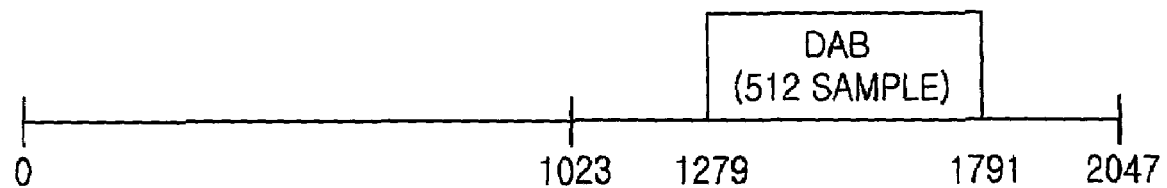
FIG. 26 is a diagram for a process of about 1446 kHz intermediate frequency signal using 2048 IFFT.

FIG. 25 shows a system parameter concerned with the in-band adjacent-channel digital audio broadcasting system in the embodiment of the present invention. The system proposed in the invention can together use COFDM and TCOFDM transmission schemes by changing an inner encoder, and this is simply valid by an adjustment of the data rate of the MPEG-2 multiplexer. Though an AAC codec capable of guaranteeing a CD audio quality in a high data compression rate is decided as a reference audio codec herein, any other audio codec with the AAC coded is applicable thereto. A system reference clock uses 27 MHz as the same as the AAC codec, and since an occupied bandwidth of the digital audio broadcasting signal is about 482 KHz, it is operable even in a case that the FM analog channel exists as the worst situation as shown in FIG. 2. The number of sub-carriers constructing the OFDM symbol is 512, and the OFDM symbol is modulated by using the 2048 IFFT 100 as shown in FIG. 26, to thereby generate an intermediate frequency (IF) signal whose central frequency is about 1446 KHz. A useful symbol duration is 1.0616 ms, and a frequency interval between sub-carriers is 0.9419 Hz. The guard interval is selected as ⅟₃₂ of the useful symbol duration in order to eliminate the inter-symbol interference (ISI) generated by a multipath fading in the FM band. In case that a data rate of the AAC codec for ensuring the CD sound quality is provided as 128 kbps, 8PSK COFDM per one digital audio broadcasting channel can transmit about four audio programs, and it can be also transmitted 5~6 audio programs in 16QAM COFDM and 8PSK TCOFDM, and about 8~9 programs in 16QAM TCOFDM.

It is checked in the following description, related to the channel allocation about Seoul region where an occupation rate of an FM signal in FM frequency band is highest, in order to grasp a usable possibility of the frequency channel for the inventive in-band adjacent-channel digital audio broadcasting system.

Figure 27:
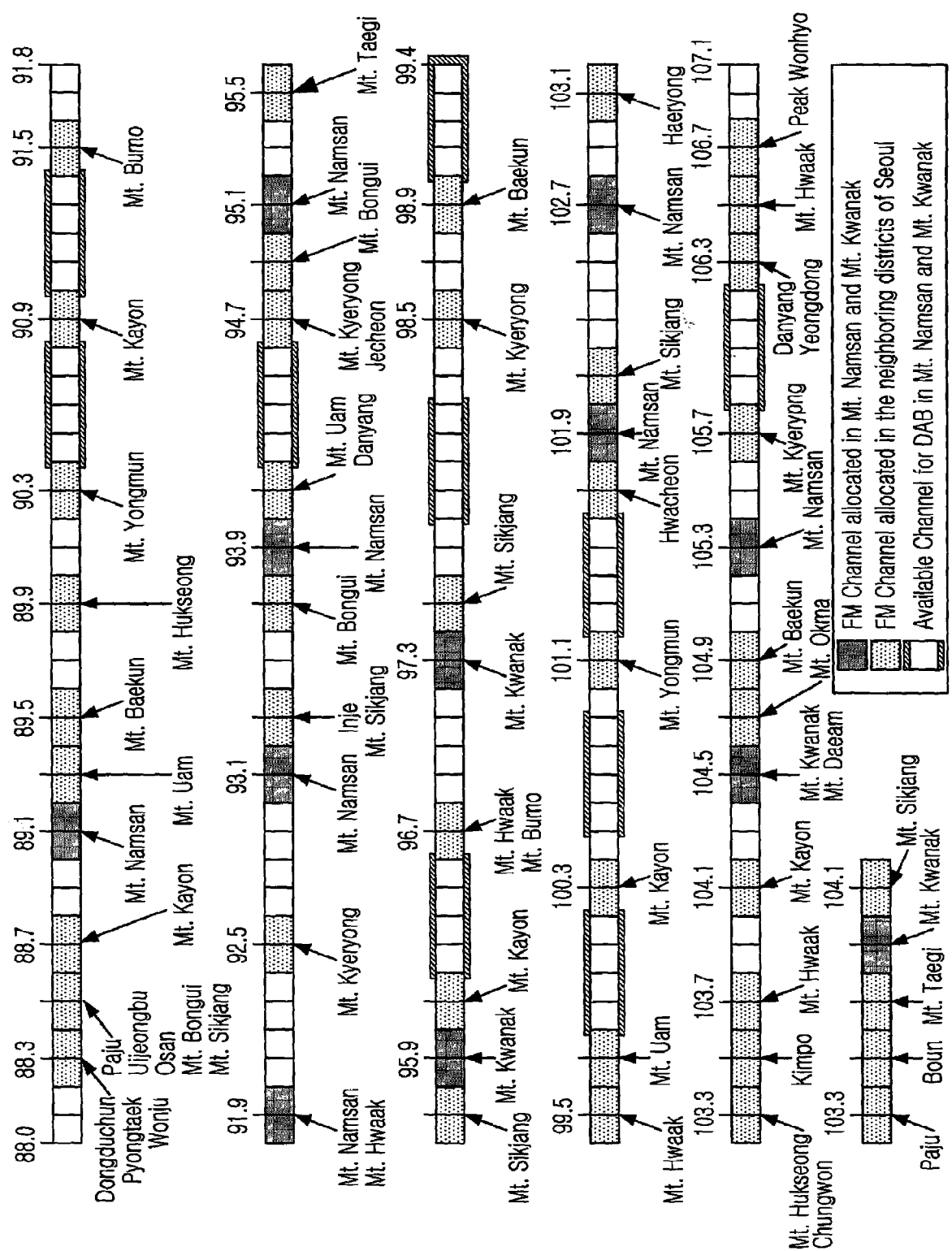
FIG. 27 is a diagram showing an analog FM broadcasting channel occupation situation of Seoul region and an operable channel situation of an in-band adjacent-channel digital audio broadcasting.

To survey a channel receivable in the capital region, it was checked channels that are being serviced from FM transmitting stations located within a radius of 150 km on the basis of Nam Mountain. However, the above distance reference can be adjusted by an output of each transmission station, an antenna gain, and a signal path profile between transmission and reception spots, etc., and in a case of assuming that 200 kHz occupied bandwidth is provided per analog channel, the present situation for the analog FM broadcasting channels allocated in Seoul region and for an operable channel of the in-band adjacent-channel digital audio broadcasting system is as shown in FIG. 27. In Seoul region, an allocation for at least 10 digital audio broadcasting channels is valid, and if this is converted into the number of transmittable audio programs, it means to be valid to transmit from about 40 programs (a case of 8PSK COFDM) to 90 programs (a case of 16QAM TCOFDM). Like this, in Seoul region having a high occupation rate for the analog FM channel, it is available to allocate 10 digital audio broadcasting channels. Therefore, it is valid to ensure more 10 channels at the other regions in Korea relatively low in the occupation rate.

Since a new frequency band, e.g., VHF/UHF band for digital audio broadcasting is not needed by using a vacant channel of the FM frequency band, a use efficiency of spectrum can be maximized, and economical expenses can be lessened according that a curtailment of expenses required for a new broadcasting infra establishment and its accompanied spectrum is gained, and that the existing broadcasting infra such as a transmitting tower or antenna etc. is usable as it is.

Further, there is an advantage of providing a high quality audio of multichannel and data service by ensuring higher data rate in comparison with the existing in-band digital audio broadcasting system.

As afore-mentioned, in accordance with the inventive embodiment, in a digital audio broadcasting transmission system of an in-band adjacent-channel type, there is no need to ensure a new frequency band by realizing a digital audio broadcasting service in the existing FM frequency band, and there also is an effect that a high quality audio of multi-channel and data service can be provided by maximizing a use efficiency of spectrum through an application of an OFDM transmission and a higher order modulation. Such inventive effect can be variously applied and utilized in a digital audio broadcasting field without deviating from the spirit or scope of the invention.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. An in-band adjacent-channel digital audio broadcasting system, comprising:
   a scrambling unit for scrambling a signal to be broadcasted, thereby generating a scrambled signal;
   an outer coding unit for performing a first encoding including a Reed-Solomon (RS) coding of the scrambled signal, thereby generating an outer encoded signal;
   an outer interleaving unit for performing a first interleaving of the outer encoded signal on a byte by byte basis, thereby generating an outer interleaved signal;
   an inner coding unit for performing a second encoding including a convolutional coding and a trellis coding of the outer interleaved signal, thereby generating an inner encoded signal;
   an inner interleaving unit for performing a second interleaving of the inner encoded signal, thereby generating an inner interleaved signal;
   a modulating unit for modulating the inner interleaved signal, thereby generating an orthogonal frequency division multiplexing (OFDM) symbols, the modulating unit including:
      a signal mapping unit for generating 8PSK or 16QAM data samples based on the inner interleaved signal;
      a frame adapting unit for constructing a transmission frame based on TPSs, pilot samples and data samples; and
      an IFFT unit for performing an inverse fast Fourier transform (IFFT) of the transmission frame to generate OFDM symbols;
   a guard interval inserting unit for inserting a guard interval between the OFDM symbols in order to eliminate an inter-symbol interference, thereby generating an OFDM frame; and
   an RF processing unit for performing a conversion of the OFDM frame into an analog radio frequency signal so that the OFDM signal can be transmitted in a specific frequency channel of an FM frequency band, and for amplifying and outputting the analog radio frequency signal, wherein
   the system concurrently supports both of coded-orthogonal frequency division multiplexing (COFDM) and Trellis COFDM (TCOFDM) transmission modes based on the same systematic parameters, and
   a conversion of the COFDM and the TCOFDM transmission modes is efficiently embodied by a change of an output data rate of an MPEG-2 multiplexer.

2. The system as recited in claim 1, wherein said system has an occupation bandwidth of about 482 kHz for the sake of a transmission within the FM band, and maintains a maximum power spectral density (PSD) level of the analog radio frequency signal lower by more 25 dB than a peak PSD level of the analog radio frequency signal in frequency domain, and a number of sub-carriers of the OFDM symbol is 512.

3. The system as recited in claim 2, wherein the OFDM symbol is OFDM-modulated by using 2048 IFFT, to generate an intermediate frequency signal whose central frequency is about 1446 kHz.

4. The system as recited in claim 1, wherein said system includes a time interleaving structure capable of applying the same interleaving depth regardless of modulation (8PSK, 16QAM) and transmission types (COFDM, TCOFDM).

5. The system as recited in claim 1, wherein said system includes a frequency interleaving of a permutation basis that is capable of being applied to a number of useful sub-carriers of two kinds of OFDM symbols, 366 and 490.

6. The system as recited in claim 1, wherein the signal transmission frame is constructed by detailed units of an OFDM super-frame, an OFDM frame, an OFDM sub-frame and an OFDM symbol.

7. The system as recited in claim 6, wherein the OFDM super-frame includes four OFDM frames, the OFDM frame includes eight OFDM sub-frames, and the OFDM sub-frame includes four OFDM symbols.

8. The system as recited in claim 6, wherein a number of useful sub-carriers constructing the OFDM sub-frame is 1,836, a scattered pilot is inserted into 128 sub-carriers of a first OFDM symbol in a pattern of 4×4 samples in a time and frequency space, and a continual pilot and a TPS are inserted into 15 and 7 sub-carriers, respectively, for all the OFDM symbols, and at this time, the scattered pilot and the continual pilot in each transmission frame has four repeated insertion positions.

9. The system as recited in claim 1, wherein the OFDM frame includes 32 OFDM symbols and a number of bits of TPS information is 32 in order to obtain a rapid synchronization of transmission frame.

10. The system as recited in claim 1, wherein a number of RS packets contained in each OFDM super-frame is 54 in case of 8PSK so that synchronization can be performed efficiently.

11. The system as recited in claim 1, wherein a number of RS packets contained in each OFDM super-frame is 72 in case of 16QAM so that synchronization can be performed efficiently.

12. An in-band adjacent-channel digital audio broadcasting system, comprising:
   a scrambling unit for scrambling a signal to be broadcasted, to generate a scrambled signal;
   an outer coding unit for performing a first encoding including a Reed-Solomon (RS) coding of the scrambled signal to generate an outer encoded signal;

an outer interleaving unit for performing a first interleaving of the outer encoded signal on a byte by byte basis to generate an outer interleaved signal;

an inner coding unit for performing a second encoding including a convolutional coding and a trellis coding of the outer interleaved signal to generate an inner encoded signal;

an inner interleaving unit for performing a second interleaving of the inner encoded signal to generate an inner interleaved signal;

a time interleaving structure capable of applying the same interleaving depth regardless of modulation (8PSK, 16QAM) and transmission type (COFDM, TCOFDM);

a modulating unit for modulating the inner interleaved signal to generate orthogonal frequency division multiplexing (OFDM) symbols, the modulating unit including:

a signal mapping unit for generating 8PSK or 16QAM data samples based on the inner interleaved signal;

a frame adapting unit for constructing a transmission frame based on TPSs, pilot samples and data samples; and an IFFT unit for performing an inverse fast Fourier transform (IFFT) of the transmission frame to generate OFDM symbols;

a guard interval inserting unit for inserting a guard interval between the OFDM symbols in order to eliminate an inter-symbol interference to generate an OFDM frame; and an RF processing unit for performing a conversion of the OFDM frame into an analog radio frequency signal so that the OFDM signal can be transmitted in a specific frequency channel of an FM frequency band, and for amplifying and outputting the analog radio frequency signal.

\* \* \* \* \*